March 15, 1955 R. L. SHALLENBERG 2,703,979
HYDRAULIC NOZZLE TESTER

Filed May 9, 1951 2 Sheets-Sheet 1

INVENTOR
ROBERT L. SHALLENBERG
BY
R. E. Meech
ATTY.

March 15, 1955  R. L. SHALLENBERG  2,703,979
HYDRAULIC NOZZLE TESTER
Filed May 9, 1951  2 Sheets-Sheet 2

INVENTOR
ROBERT L. SHALLENBERG
BY
R. E. Mech
ATTY.

United States Patent Office 2,703,979
Patented Mar. 15, 1955

2,703,979

HYDRAULIC NOZZLE TESTER

Robert L. Shallenberg, Westchester, Ill.

Application May 9, 1951, Serial No. 225,447

3 Claims. (Cl. 73—46)

This invention relates to hydraulic testing devices, and particularly to an improved device for testing the nozzles of diesel engines and the like.

While various types of nozzle testers have been heretofore suggested and used, they were usually cumbersome and necessarily had to be mounted on a solid support such as a bench or other flat surface when in use, and were operated by a relatively long handle which made them awkward to use. Also, it was usually necessary to remove the nozzle to be tested from the engine, which was laborious as well as inconvenient. Also, in such devices no means was provided to shut off the testing device from the line while testing the line for leakage, and, as a result, any leakage drop in the pressure recorded by the gauge could be in the testing device itself thereby not providing a true and accurate test.

Accordingly, it is the general object of the present invention to provide an improved testing device which overcomes these disadvantages.

It is one of the objects of this invention to provide an improved testing device which may be transported readily and need not be mounted for operation, and can be used conveniently to test nozzles while they are connected to the engine.

It is still another object of the invention to provide an improved testing device which is compact and convenient and easy to use and, at the same time, efficient and effective in its use.

It is a further object of the present invention to provide an improved testing device which is so constructed that the line to which the nozzle to be tested is connected can be shut off from the pressure gauge while the line is being filled with the testing liquid thereby protecting the gauge from violent pressure surges, and also a construction in which the pumping means of the testing device may be shut off from the nozzle and the line to which it is connected during the testing of the nozzle and line.

Various other objects and advantages of this invention will be more apparent in the course of the following specification, and will be particularly pointed out in the appended claims.

In the accompanying drawings, there is shown for the purpose of illustration, an embodiment which my invention may assume in practice.

Figure 1:
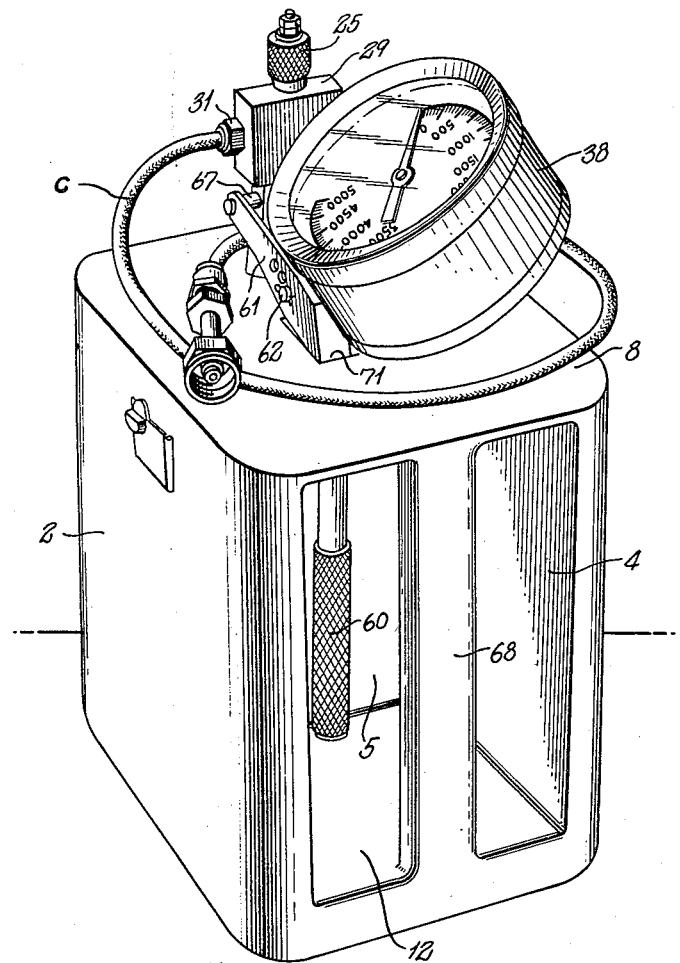
Fig. 1 is a perspective view of the improved testing device of my invention with the cover removed.

Referring more particularly to the drawings, my improved hydraulic nozzle tester comprises a body member or casing 2 having two compartments 3 and 4 arranged therein separated by a common wall 5. The compartment 3 is a reservoir which contains a liquid, preferably a suitable oil for actuating the device. In the compartment 3, there is arranged a vertically extending tubular member 6 having a longitudinally extending passage 7 arranged axially thereof. This tubular member 6 extends upwardly through the top wall 8 of the compartment 3 and is supported therein by a threaded connection, as at 9, in a block member 10 which rests on the bottom wall 12 of the body member.

On the upper end of the tubular member 6, there is arranged another tubular member 13 having a passage 14 therein and which is threadedly connected, as at 15, to the upper end of the tubular member 6. Also in the upper end of the tubular member 6, there is arranged a discharge valve 16 which controls the flow of the liquid between the passages 7 and 14. There is arranged with this valve a coil spring 17 for maintaining it normally seated or closed.

There is mounted on the upper end of the tubular member 13, a control valve 18 consisting of a valve body 19 having a longitudinally extending passage 20 therein. This valve is preferably a three-way valve for a purpose hereinafter to be described. There is arranged axially of the valve body in the passage 20 therein, a valve stem 21 having a valve head portion 22 arranged on the lower end thereof which cooperates in one position with a seat 23 arranged around the upper end of the passage 14 therein, and in another position with a seat 24 arranged at the lower end of passage 20 in the valve body 19. On the upper end of the valve stem 21 and integral therewith, there is arranged a knurled adjusting nut 25 having a threaded connection with the body member, as at 26, for the purpose of adjusting the valve.

In the vicinity of the valve head portion 22, there is provided in the tubular member 13, a transversely or diametrically arranged passage 27 which communicates with an annular passage 28 arranged around the outer side of the tubular member 13 between the same and a block-like connecting member 29 arranged therearound. As more clearly shown in Fig. 4 of the drawings, this annular passage communicates with a passage 30 arranged in the connecting member or fitting 29 which in turn communicates with a passage in a discharge connection 31 to which the nozzle to be tested is adapted to be connected.

Intermediate the length of the valve body 19, there is arranged a transverse passage 32 which communicates with an annular passage 33 arranged therearound between the valve body and the tubular member 13. As more clearly shown in Fig. 3 of the drawings, in the tubular member 13 directly opposite the annular passage 33, there is another transversely or diametrically arranged passage 34 which in turn communicates with an annular passage 35 which in turn communicates with a passage 39 in the connecting member 29 and which in turn communicates with a passage 36 in the stem 37 of the gauge 38.

Also, within body member 2 there is arranged a pump 40 for forcing the liquid up through the tubular member 6 in a manner to be described. This pump consists of a cylinder 41 arranged vertically within compartment 3 next to the tubular member 6. The lower end of the cylinder is threadedly connected, as at 42, to the block member 10 and communicates with a chamber 43 therein in which there is arranged a suction valve 44. The chamber 43 communicates with a vertical passage 45 in a screw-like member 46 arranged in the bottom wall 12 of the body member 2. The valve 44 is seated normally on a seat 47 arranged on the upper end of the screw-like member 46 around the passage 45 therein and is held seated by means of a coil spring 48. The passage 45 in the screw-like member 46 communicates with a transverse passage 49 therein which passage in turn communicates with a passage 50 in the lower end of the block-like member 10 which latter passage opens into the compartment 3 through an annular filter 51. The lower end of the passage 7 in the tubular member 6 communicates with the annular passage 52 arranged around the lower end of the cylinder 41 in the block member 10 by means of an angularly arranged passage 53.

Within the cylinder 41, there is reciprocally arranged a piston 54 having a coil spring 55 arranged therearound at the upper end thereof. One end of this spring abuts a shoulder 56 in the upper end of the cylinder 41, and the other end abuts a bushing 57 secured to the upper end of the piston. There is telescopically mounted on the upper end of the cylinder 41 and piston 54, a cap-like member 58 having a portion 59 which extends up through the top wall 8 of the body member 2.

In the compartment 4, there is arranged a substantially L-shaped handle member 60 which extends up through an opening 71 in the top wall 8 of the body member with the horizontal portion 61 thereof pivotally connected by means of a pin 62 to a projection 63 arranged on the upper side of the top wall. There is arranged in the projection 63, a plurality of sets of holes, three in the present instance, as at 64, 65, and 66, in which the pin 62 may be adjustably positioned for adjusting the pivotal position of the handle for a purpose to be described. On the outer end of the horizontal portion 61 of the handle, there is arranged preferably a roller 67 which rests at all times on the upper end of the portion 59 of the cap-like member 58.

In the front wall of the body member, as more clearly shown in Fig. 1 of the drawings, directly opposite the handle 60, there is arranged a vertically extending rib-like portion 68 which acts both as a handle for carrying the tester and as a grip for actuating the handle 60 by a squeezing action of the hand. On top of the body member, there is arranged preferably a cover 69 around the lower edge of which there is arranged preferably a gasket 70 for preventing dust from accumulating on the gauge and its associated parts when the tester is not in use.

Figure 2:
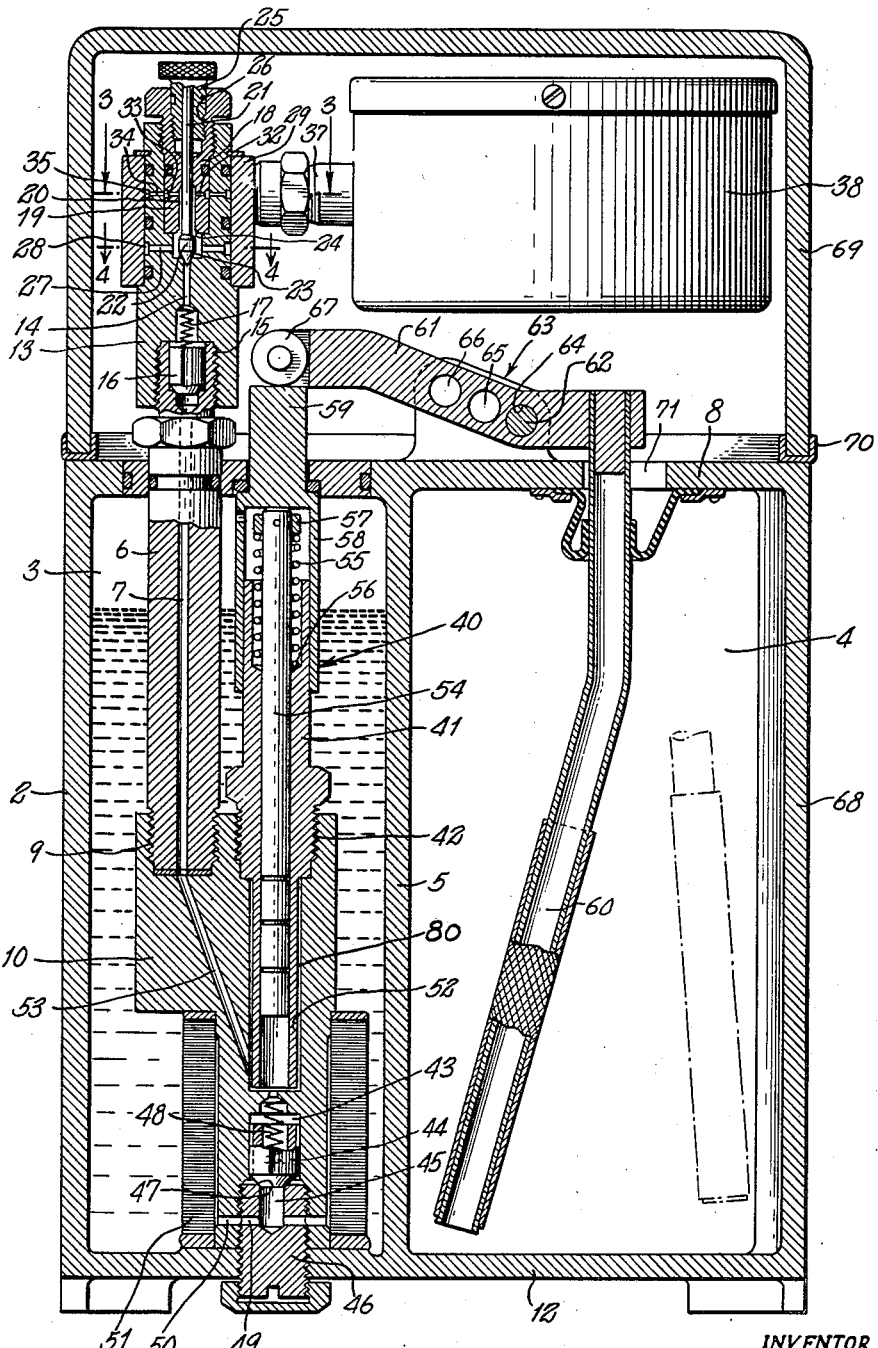
Fig. 2 is a vertical cross sectional view through the testing device of the present invention showing the cover in place.

The improved nozzle tester of our invention operates in the following manner. The free end of the flexible connection C, as shown in Fig. 1 of the drawings, which is connected to the connection 31 in the fitting 29 is first connected to the nozzle to be tested. The handle 60 is then moved to the right, as shown in Figs. 1 and 2, by a squeezing action of the operator's hand in conjunction with the rib-like portion 68. This movement of the handle pivots about the pin 62 and forces the cap-like member 58, together with the piston 54, downwardly in the cylinder 41 against the action of the spring 55 thereby displacing the testing fluid disposed in the bottom of the cylinder and forcing it up through the passage 53 in the block 10 and the passage 7 in the tubular member 6, and opens the discharge valve 16 against the action of the spring 17 arranged therewith. The testing fluid then passes up through the passage 14 to the three-way valve 18 which is shown in its closed position.

Figure 4:
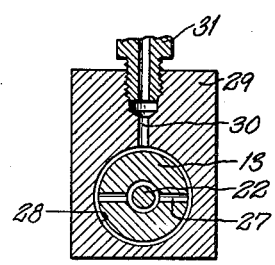
Fig. 4 is a sectional view taken on line 4—4 of Fig. 2.

Now, when the valve 18 is open and in its neutral and operating position, i. e., the valve head is not seated at either end, the testing fluid passes from the passage 14 into the diametrically arranged passage 27 into the annular passage 28 and passage 30 to the discharge connection 31 and through the flexible connection C to the nozzle being tested, as more clearly shown in Fig. 4.

Figure 3:
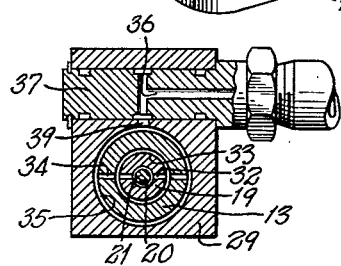
Fig. 3 is a sectional view taken on line 3—3 of Fig. 2.

At the same time, the pressure produced by the pump is indicated on the gauge 38 by the testing fluid which also passes up through the annular chamber around the valve stem 21 in the valve body 19 into and through the passage 32 in the valve body and into and through the passage 34 in the tubular member 13 into an annular passage 35 and in turn through the passage 36 in the stem 27 and into the gauge, as more clearly shown in Fig. 3. The reading on the gauge will indicate the testing pressure of the nozzle.

After the nozzle has been tested, the handle 60 is released and the handle is moved to the left, as shown in Fig. 2, to its normal position and the piston is returned to its uppermost or normal position by the action of the spring 55. Also, the discharge valve 16 is seated and closed by the action of the spring 17.

When a void is produced in the bottom of the cylinder 41, i. e., in case some of the testing fluid is lost therefrom in testing, the testing fluid in the reservoir 3 is drawn therefrom through the filler 51 and suction valve 44 and into the bottom end of the cylinder by the retractable action of the piston 54 in order to fill the cylinder to the proper level for the next testing operation. The maximum quantity of testing fluid withdrawn from the reservoir and delivered into the cylinder is achieved with the pivot pin 62 of the handle in the position shown in Fig. 2. It will be understood that the maximum pressure obtainable in this position of the pin is limited by the strength of the operator's grip. Should higher pressures be desired, the pivot pin 62 may be moved to location 65 for medium high pressures or to location 66 for relatively high pressures. It will be understood that gauges of different ranges may be readily interchanged.

If it is desired to test leakage of the nozzle or equipment associated therewith, pressure is applied as above described with the valve 18 open. After the pressure is applied by the pump, the valve 18 is closed, i. e., the valve head 22 is seated on its lower seat thereby leaving the gauge open to the nozzle but closing the gauge and nozzle to the pump thereby eliminating any possible leakage of the testing fluid to or from the pump during the test.

By providing such a construction, it will be seen that access may be readily and conveniently had to both the suction valve 44 and the discharge valve 16. Also, by such a construction, it is possible to fill the fuel lines with the gauge completely shut off from the system by means of the three-way valve 18, thereby protecting the gauge against violent pressure surges.

As a result of my invention, it will be seen that there is provided not only a nozzle tester of a simple construction, but one which is readily portable and conveniently used. With my tester it is possible to make frequent tests on the valves in an engine without removing the same from the engine and to determine opening pressures and leakage condition. That is to say, with the use of my tester, it is possible to make a complete analysis of a fuel injection system in a minimum length of time without removing anything except the fuel injection lines.

Also, in my construction, it will be seen that the lower end of the cylinder 41 is surrounded by the testing fluid under pressure along its length, as at 80. It will be seen that this lower end of the cylinder is relatively thin and made preferably of a soft anti-frictional material. Thus, it will be seen that as the pressure between the piston 54 and the cylinder decreases as the distance from the discharge end of the cylinder increases, the net pressure effect on the cylinder is to contract it against the piston so as to obtain a more efficient pumping action.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. An hydraulic nozzle tester of the class described comprising a hollow body member having an enclosed liquid reservoir therein, a tubular member carried by said body member and extending into said reservoir and up through the top wall of said body member, a three-way valve arranged on the upper end of said tubular member having a longitudinally extending passageway therein, a pressure gauge connected to said valve and communicating with the passageway therein, means for connecting said valve to the nozzle to be tested, a discharge valve arranged adjacent the upper end of the tubular member between the passageway in said last mentioned valve and the passageway in said tubular member, means for pumping the liquid from said reservoir into and through said tubular member and through said valves, said last mentioned means including a relatively thin walled cylinder having a piston arranged therein, said cylinder arranged in said reservoir so as to be surrounded by the liquid under pressure therein substantially throughout its length whereby the pressure between the piston and the cylinder decreases as the distance of the piston from the discharge end of the cylinder increases, a passageway arranged between the lower end of said tubular member and the discharge end of said cylinder, a suction valve arranged adjacent the discharge end of said cylinder which is adapted to control the passage of the liquid from said reservoir to last mentioned passageway and into said tubular member, a handle member arranged within said body member for actuating said piston, said handle member pivotally connected intermediate its length to said body member, and means carried by said body member which when normally grasped and squeezed manually together with said handle will actuate said piston to force the liquid from the reservoir into said tubular member and through said valves.

2. An hydraulic nozzle tester of the class described, as defined in claim 1, including means for adjusting the pivotal connection of said handle with said body member whereby the pressure exerted on said piston by said handle member may be varied so as to provide test pressures over a relatively wide range.

3. An hydraulic nozzle tester of the class described comprising a body member having an enclosed liquid reservoir therein, a tubular member arranged in said reservoir extending upwards through the top wall thereof, a three-way valve arranged on the upper end of said tubular member having a longitudinally extending passage therein whereby the pressure may be opened to the line to which the nozzle is connected with the tubular member shut-off to the valve enabling leakage in the line to be determined by the gauge or whereby the gauge may be closed to the nozzle and the line to which it is connected while pumping the liquid into the line so as not to develop an excessive pressure fluctuation in the line, means for connecting the nozzle to be tested to the passage in said valve, means for connecting a pressure gauge to the passage in said valve, and means for pumping the liquid from said reservoir into and through said tubular member, said last means including a cylinder and piston arranged in the liquid in said reservoir so as to be surrounded thereby, a passage arranged between said reservoir and said cylinder, a manually actuated handle member arranged within said body member having one end thereof engaging a piston actuating means arranged with said piston and being pivotally connected intermediate its length to said body member, and means carried by said body member which when normally grasped and squeezed together with said handle will actuate said piston to pump the liquid from the reservoir into said tubular member.

References Cited in the file of this patent

UNITED STATES PATENTS

| | | |
|---|---|---|
| 476,082 | Sellon | May 31, 1892 |
| 1,027,834 | Fulmer | May 28, 1912 |
| 2,183,189 | Gormley | Dec. 12, 1939 |
| 2,212,466 | Bradford | Aug. 20, 1940 |
| 2,248,888 | Monagan | July 8, 1941 |
| 2,539,843 | Kerr | Jan. 30, 1951 |
| 2,658,386 | Guichard | Nov. 10, 1953 |